Feb. 3, 1959   G. A. BOWLES   2,872,560
COFFEE PERCOLATOR
Filed Nov. 1, 1957
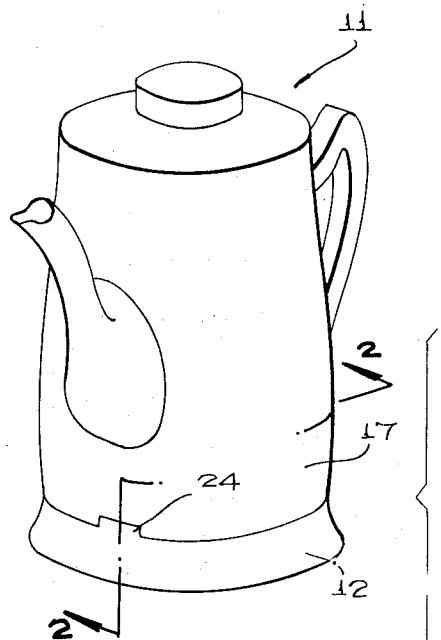
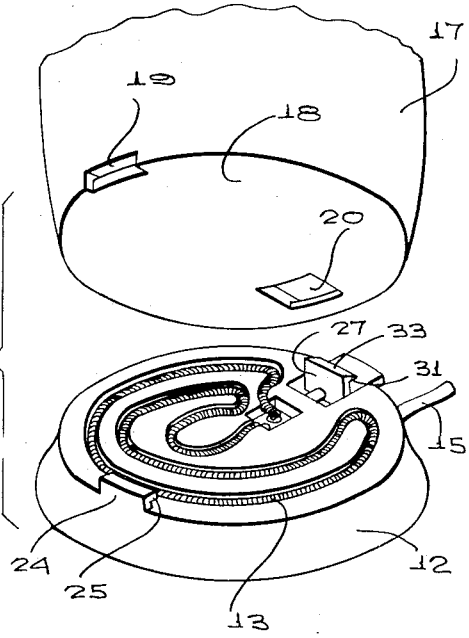
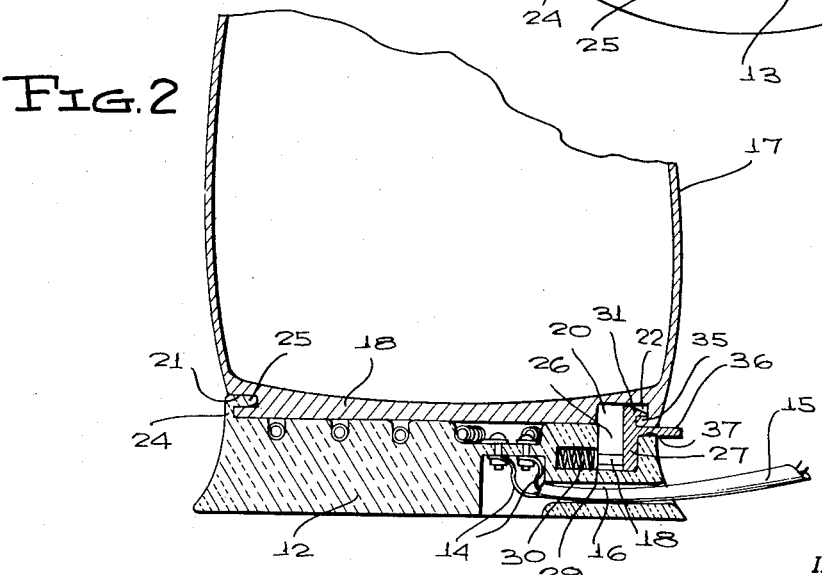
INVENTOR.
GLEN A. BOWLES
BY
McMorrow, Berman + Davidson
ATTORNEYS

United States Patent Office 2,872,560
Patented Feb. 3, 1959

2,872,560

COFFEE PERCOLATOR

Glen A. Bowles, Winston, Oreg.

Application November 1, 1957, Serial No. 693,945

2 Claims. (Cl. 219—43)

This invention relates to beverage making devices, and more particularly to a coffee percolator.

The main object of the invention is to provide a novel and improved electrical beverage making device which is arranged so that the beverage receptacle portion thereof may be at times disengaged from the heating portion thereof, to permit use of the beverage container portion separately from the heating portion, to facilitate cleaning of the beverage container portion, and to allow the heating portion to be used independently for heating other vessels, if so desired.

A further object of the invention is to provide an improved separable coffee percolator which is inexpensive to manufacture, which is simple in construction, which is highly durable, and which provides maximum utilization both of the beverage containing portion thereof and the heating portion thereof.

Further objects and advantages of the invention will become apparent from the following description and claims, and from the accompanying drawings, wherein:

Figure 1 is a perspective view of an improved coffee percolator constructed in accordance with the present invention.

Figure 2 is an enlarged fragmentary vertical cross sectional view taken on the line 2—2 of Figure 1.

Figure 3 is a fragmentary perspective view showing the heating portion of the percolator and the lower portion of the beverage containing section thereof in separated positions.

Referring to the drawings, the improved beverage making device is designated generally at 11 and comprises a base 12 provided with an electric heating element 13, said heating element having its terminals connected to a pair of supply wires 14, 14 contained in a conventional line cord 15 extending outside said base 12, through a passage 16, and provided at its end with a conventional two-prong male plug. Designated at 17 is a beverage receptacle which in this case may be a coffee percolator, the receptacle having the thickened bottom wall 18 formed with a pair of diametrically alligned recesses 19 and 20. The recess 19 is located at the edge of the bottom wall 18 and is formed with the horizontal upper portion 21. The recess 20 is located adjacent the opposite side of the bottom wall 18 and is formed with a similar horizontal portion 22.

The base 12 is formed at one side thereof with an upstanding lug 24 having the inwardly directed top flange portion 25 which is engageable in the recess 19. At its opposite side, the base member 12 is formed with a recess 26 opening at its top surface and having a vertical locking bar 27 slidably positioned therein. The locking bar 27 has a horizontal shank portion 28 on which is secured a bearing washer 29. A coiled spring 30 is positioned in a horizontal recess portion aligned with the shank 28 and bears between the end wall of said horizontal recess portion and the washer 29, biasing the vertical bar member 27 to the right, as viewed in Figure 2. The vertical bar member 27 is formed at its top end with an outwardly extending horizontal detent lug 31 having a beveled top surface 33, as is shown in Figure 3, the detent lug 31 being receivable in the horizontal recess portion 22 of the bottom wall 18 of the receptacle member 17.

To interconnect the beverage container portion 17 with the base 12, the leg 28 is first engaged in the horizontal recess portion 21 and the container 17 is then pushed downwardly so that the detent lug 31 enters the recess 20 and yields sufficiently to allow the bottom lip 35 of recess 20 to slip past the beveled detent lug 33. The spring 30 then forces the bar member 27 outwardly so that the detent lug 31 engages in the recess portion 22, holding the container 17 connected to the base 12.

The vertical bar member 27 is provided with a laterally extending, rigid release arm 36 which projects outwardly from the top of the base 12 and is slidable in a horizontal groove 37 formed in the base adjacent the recess 26. By exerting manual inward force on the arm 37 the detent lug 31 may be retracted from the horizontal recess portion 22, facilitating the disengagement of the container portion 17 from the base 12 when it is desired to separate the container portion and base. Thus, by pressing inwardly on the arm 36, the detent member 31 may be disengaged from the recess portion 22, allowing the container 17 to be tilted slightly and to be then retracted from the horizontal flange 25 of the fixed locking lug 24, whereby the flange 25 is disengaged from the horizontal recess portion 21, allowing the container 17 to be freely removed from the base 12.

With the container removed from the base, the container may be employed independently, and may be washed without any risk of damaging the heating element. Likewise, the base 12 may be employed independently as a hot plate, and may be employed for heating other receptacles, if so desired.

While a specific embodiment of an improved separable beverage making device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a beverage making device, a base, an electric heating element mounted in said base, a beverage receptacle, the bottom of said receptacle being formed with a plurality of locking recesses having horizontal upper portions, upstanding means on said base having horizontal lug elements lockingly interengageable in said horizontal upper portions of the locking recesses and including an upstanding latch element slidably mounted in said base, and spring means biasing said latch element toward locking engagement in its locking recess.

2. In a beverage making device, a base, an electric heating element mounted in said base, a beverage receptacle, the bottom of said receptacle being formed with a pair of locking recesses located at opposite sides of the bottom of the receptacle and having horizontal upper portions, a rigid upstanding locking lug on the base receivable in one of the locking recesses, an upstanding locking lug slidably mounted in the base and receivable in the other locking recess said lugs having horizontally extending upper portions respectively lockingly engageable with said horizontal upper portions of the locking recesses, spring means biasing the slidable lug toward locking engagement in its recess, whereby said receptacle may be at times releasably locked on said base in heat-transmitting relationship therewith, and a horizontally extending release arm on said slidable locking lug, said release arm extending outwardly of the periphery of the base.

References Cited in the file of this patent

UNITED STATES PATENTS

| | | |
|---|---|---|
| 681,982 | Savage | Sept. 3, 1901 |
| 726,241 | Ayer | Apr. 28, 1903 |
| 1,006,104 | Kuhn | Oct. 17, 1911 |
| 1,997,485 | Cwelich | Apr. 9, 1935 |

FOREIGN PATENTS

| | | |
|---|---|---|
| 631,408 | Germany | June 19, 1936 |